United States Patent Office 3,451,847
Patented June 24, 1969

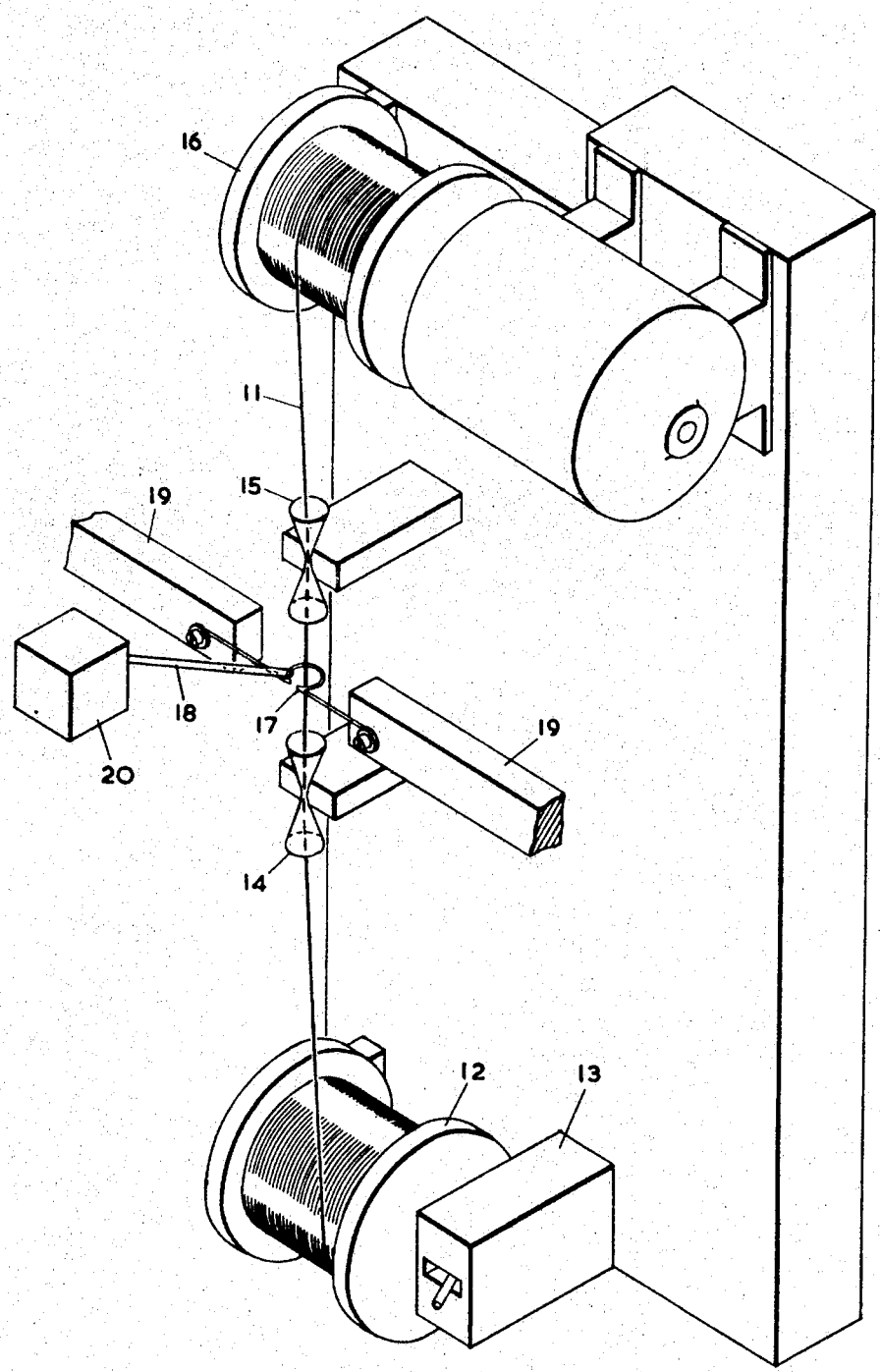

3,451,847
METHOD OF COATING METALLIC WIRE OR STRIP WITH GLASS
Raymond Sidney Ashpole and Sydney Tom Wells, Stafford, England, assignors to The English Electric Company Limited, London, England, a British company
Filed Feb. 17, 1966, Ser. No. 528,143
Claims priority, application Great Britain, Feb. 17, 1965, 6,919/65
Int. Cl. B44d 1/42
U.S. Cl. 117—231                                4 Claims

ABSTRACT OF THE DISCLOSURE

A method of applying a glass insulating coating to a metal wire or strip, including forming a bead of molten glass on a loop or frame of heated material, or between two electrodes, passing the wire or strip through the bead to coat it with molten glass, and allowing the glass to solidify.

The method is particularly applicable to fine wires, for example, circular-section wires down to 0.025 mm. diameter, and to thin strip, and coatings of 0.005 mm. thickness have been produced, in a single pass, with good electrical insulating properties.

The resultant insulated wire or strip may be used continuously at temperatures up to 450° C. (842° F.).

---

This invention relates to insulating coatings.

According to this invention in one aspect, a method of applying a glass insulating coating to metal wire, strip or the like includes the steps of forming a bead of molten glass on a loop or frame of heated material, or between two electrodes, passing the metal wire, strip or the like through or in juxtaposition with the bead whereby the metal wire, strip or the like is coated with molten glass, and allowing the molten glass to solidify.

This invention, in another aspect, includes an insulated metal wire, strip or the like made by the above method.

One embodiment of the invention will now be described by way of example with reference to the accompanying drawing, which diagrammatically illustrates a method in accordance with the invention for applying a glass insulating coating to a metal wire.

The wire to be coated is thoroughly cleaned and its surface is prepared as necessary to allow glass to adhere. The surface preparation depends on the metal of the wire, but thorough degreasing is usually necessary.

Examples of metal wire which have been coated with glass insulation by this method include platinum wire 0.025 mm. diameter, 92 percent platinum 8 percent tungsten wire 0.025 mm. diameter, nickel wire 0.1 mm. diameter, nickel chromium alloy wire 0.17 mm. diameter, Chromel wire (approximately 90 percent nickel, 10 percent chromium) 0.17 mm. diameter, Alumel wire (approximately 98 percent nickel, 2 percent aluminium) 0.17 mm. diameter and nickel-clad copper wire. Metal strip of certain of the above compositions has also been coated, for example Brightray C strip (approximately 80 percent nickel, 20 percent chromium) 0.05 mm. thick and 0.8 mm. wide.

For coating wires made from readily oxidisable materials a protective inert or reducing atmosphere may be provided, to prevent oxidation of the metal.

In certain cases controlled oxidation of the wire is necessary or desirable before coating. The invention can be applied to any known form of unstranded wire or strip within certain practical dimensional limits, and is not limited to wire of circular section.

Referring to the drawing, the wire 11 is drawn off a stock spool 12 provided with holding means 13 for regulating the tension of the wire. The wire passes over or through guides 14, 15, which may be in the form of tapered glass tubes, pulley wheels, or other low-friction devices, which must not contaminate the wire, and is taken up on a driven spool 16.

Between the guides 14, 15 is a loop 17, which is shown as being in the form of a capital omega; it has been found desirable to use an open-sided loop, particularly when coating fine wires, e.g. of 0.025 mm. diameter, so that the wire can be introduced into the loop when in motion. For coating larger-diameter wires, a closed loop or frame may be used. The loop 17 is secured between busbars 19.

The loop 17 is shown as being made of platinum resistance wire, the gauge of the wire and the dimensions of the loop depending on the size of the wire 11 being coated. The loop is heated by passing an electrical current through it, preferably a high current at low voltage, and glass is fed onto the loop and melts, surface tension forces confining the molten glass to the vicinity of the loop.

As the wire 11 to be coated is passed slowly through the loop 17, under tension, a molten glass coating is deposited on it; since the heating is localised, the glass coating quickly solidifies, and the coated wire passes through or over guide 15 onto the take-up spool 16. The guide 15 and take-up spool 16 should be such that the wire is not sharply bent, which might crack the coating, and should not be abrasive.

Two specific examples will now be given in tabular form:

Example 1

Wire 11:
    Material ------------------ 92% Pt 8% W.
    Diameter ------------------ 0.025 mm.
    Speed --------------------- 12 cm. per min.
Loop 17:
    Material ------------------ Pt wire.
    Wire diameter ------------- 0.1 mm.
    Loop inside dia ----------- 1 mm.
    Heating current ----------- 36 amps. at 0.8 volt.

An adherent glass coating 0.005 mm. thick was formed on the wire in this example by passing it through the loop at the speed stated.

Example 2

Wire 11:
    Material------------------- Alumel.
    Diameter------------------- 0.17 mm.
    Speed---------------------- 25 cm. per min.
Loop 17:
    Material------------------- Pt wire (seven strand).
    Wire diameter------------- 0.75 mm.
    Loop inside dia----------- 5 mm.
    Heating current----------- 72 amps at 1½ volts.

An adherent glass coating 0.005 mm. thick was formed on the wire in this example.

The power supply to the loop 17 was from a 12 volt 400 amp D.C. source, controlled at the input by variable auto-transformers. The loop in each case was heated to approximately 1100° C., and it was found that pieces of cullet melted rapidly when fed onto the loop.

The glass may be fed onto the loop 17 automatically, in the form of rod 18, the rate fo feed being such as to maintain a meniscus of molten glass on the loop, by means of a rod feeding device 20.

The wire 11 may be preheated if required, which may assist in preventing an undesirably thick coating.

The loop 17 may be made of any suitable resistance material, and any glass may be used provided that the temperature at which it becomes sufficiently fluid to be applied does not approach the melting point of the loop material or of the wire to be coated.

Alternatively, instead of a loop 17 of resistance wire, two separate electrodes may be used, the glass being maintained in the molten condition by heating as a result of its own resistance and the flow of current. In this case an external source of heat is required to initiate the process.

Furthermore, the wire may be passed more than once through the bead of molten glass, and this has been found in certain cases to result in an improved product, i.e. a wire of which the insulation has fewer points of low dielectric strength. The wire may be passed through the same bead a number of times, or through a number of consecutive beads.

The invention is applicable to the coating of composite wires, for example plated or clad wires, such as nickel-clad copper wire.

Depending on the glass composition and metal chosen, certain insulated metal wires in accordance with the invention are capable of continuous use at 450° C.

We claim:

1. A method of applying a glass insulating coating to metallic wire or strip including the steps of forming a bead of molten glass on a heated wire loop, passing the said metallic wire or strip through or in juxtaposition with the bead, whereby the metal wire is coated with molten glass, and allowing the molten glass to solidify.

2. A method as claimed in claim 1, in which the loop is of resistance wire and is heated by the passage of an electrical current therethrough.

3. A method as claimed in claim 1 or claim 2, in which said loop is open-sided.

4. A method as claimed in any one of claims 1 and 2, including the step of preheating said metallic wire or strip before passing it through or in juxtaposition with the bead.

References Cited

UNITED STATES PATENTS

| | | | |
|---|---|---|---|
| 2,589,169 | 3/1952 | Veale | 117—129 X |
| 2,649,756 | 8/1953 | Egee et al. | 118—401 |
| 3,264,122 | 8/1966 | Earl | 117—129 X |
| 3,273,225 | 9/1966 | Saums et al. | 117—231 X |
| 3,404,025 | 10/1968 | Wootten | 117—120 |

ALFRED L. LEAVITT, *Primary Examiner.*

C. K. WEIFFENBACH, *Assistant Examiner.*

U.S. Cl. X.R.

117—120, 129; 118—420